KLAUS LEHMANN,
Inventor:

United States Patent Office 3,447,731
Patented June 3, 1969

3,447,731
MANUFACTURE OF PACKING TRAYS PRODUCED IN MOULDED PLASTIC, IN PARTICULAR MOULDED PLASTIC SHEET
Klaus Lehmann, Avenida de America 44, Madrid 2, Spain
Filed Sept. 25, 1967, Ser. No. 670,302
Claims priority, application Spain, Oct. 7, 1966, 332,066
Int. Cl. B65d 1/34, 3/24, 5/66
U.S. Cl. 229—2.5
3 Claims

ABSTRACT OF THE DISCLOSURE

A packing molded plastic tray which is divided into two halves, a hinge construction is provided between such halves so that material may be packed in one while the other half is arranged to fold down on the first half. The tray contains truncate conical cavities with inwardly curved surfaces which are grooved along generatrix lines. Partitions are provided in the tray whose axes pass through the centers of the cavities in longitudinal and transverse directions at right angles to one another. The partitions have a height which exceeds half the height of the cavities so that when the units are stacked on top of one another there is no contact between or pressure exerted upon the separate cavities.

---

The present invention relates to improvements in the manufacture of packing trays produced in moulded plastic, preferably in moulded plastic sheet, which trays can be used for storing fruits, eggs and other objects in the moulded cavities in the tray, and are suitable as a packing for transportation and sale purposes.

For some time now, packing units of cardboard and plastic materials, containing moulded cavities have been known, which are used for packing eggs, etc. and are made up of two identical halves which can be folded together and closed through the medium of articulating moulded portions, these packings being provided with partitions intermediate of the different cavities whose moulded heights are at the most half the height of the cavities since it would otherwise not be possible to stack the filled packing units one inside the other in the manner hereinafter described.

It is possible and has been known for some time, to stack on top of one another a number of closed packings of this general kind, since there is necessarily between any four cavities a recess or depression (viewed at the top of the closed packing) in which there is situated the cavity portion of the next packing. All the packings of this type thus far known are so designed that the separate cavities act as locations for subsequent packings which may be stacked on top. In this context, the connecting partitions between the separate cavities cannot be any higher than half the height of a cavity, because otherwise it would be impossible to achieve the proposed stacking of different packings, one inside the other, with the cavities acting as locations or supports.

The kind of stacking arrangement usual nowadays, in which the cavities are employed to store and locate the material being packed, and also, basically, as locations and supports for units which are stacked one on top of the other, on the one hand exhibits the drawback that the material to be packed, which is located in the cavities, is directly exposed to the effects of pressure and vibration, and on the other hand that the cavities of the packings are of pyramidical or truncate right cone form with the result that the generally round materials being packed such as eggs and tomatoes for example, are only supported at certain points of the cavity with the effect that breakages or rupture of the material can very easily occur.

Again, it has already been known for sometime, in the context of cardboard packings and more recently of plastic packings, to provide distance pieces by means of which a packing unit which is closed by placing two halves together can be ventilated.

Generally speaking, the improved tray in accordance with the present invention, is designed as follows:

It is subdivided into two identical halves, which are separated from one another by one or more joints as well as by intermediate partitions. One of these halves, with the cavities it contains, serves in the manner aforementioned to receive the material being packed, whilst the other half, also containing cavities, serves as a lid and can, thanks to the joints formed in the tray, swing through approximately 180° in order to be positioned over the material hitherto resting exposed in the other half of the packing. In this way, a packing unit is created in which the material is firmly held even if the unit is turned upside down.

Between the separate cavities, moulded connecting partitions are produced the axes of which pass through the centres of the cavities and make an angle of 90° with one another.

Where the quality of the materials being packed renders this desirable, ventilation of the closed packing unit is achieved by arranging between the two halves of the tray spacing protuberances. In addition, for improved ventilation of the packing unit, it is possible to provide one or more holes in the base of the cavities.

For ease of closing and opening the two halves, the packing may be provided with one or more press-stud arrangements which may also serve as spacers and can be moulded in situ in the tray.

The features of the tray will now be described in greater detail:

The cavities in the tray are of truncate conical form, the conical surfaces being curved inwardly so that all the items being introduced into the packing, which are rounded to a greater or lesser extent, encounter a maximum load-bearing surface in order as far as possible so to avoid any damage to them. In addition, a truncate conical cavity with a surface which is curved inwardly, is suitable, within certain limits, for holding materials of different diameters.

The surfaces of these cavities contain various grooves in planes perpendicular to their bases, which grooves should not extend into the internal part of the cavity but must be formed in such a way that they pass across the exterior of the cavity along the truncate conical surface. In this way, the creation of pressure zones vis-a-vis the material held in the packing is avoided. Moreover, the grooves enable the cavity to flex elastically so that it can adapt to the particular shape of the material being packed thus providing maximum support thereto, this being a necessary feature in order to keep the superficial loading on the packed material low.

The base of a truncate conical cavity of this sort has a form which is made up of a number of small pyramidical shapes by which good location is achieved when a number of packing units are stacked one atop the other; such stacking of packing units in accordance with the present invention should only be effected in the static state, that is to say it should not be carried out during periods of transportation of the filled packing units.

The partitions arranged between the separate cavities are higher than half the height of a cavity, as a consequence of which, in the case of packing units which are stacked one inside the other, the complete load is not taken by the cavities but by the intermediate partitions. In this way, protection for the packed material, arranged in packing units stacked one inside the other in interposed fashion, is ensured, the cavities not having to support the load imposed by the subsequent packing units which rest on top of them.

The invention will now be explained making reference to the attached drawings which illustrate an embodiment of the invention but in no restrictive sense.

Figure 4:
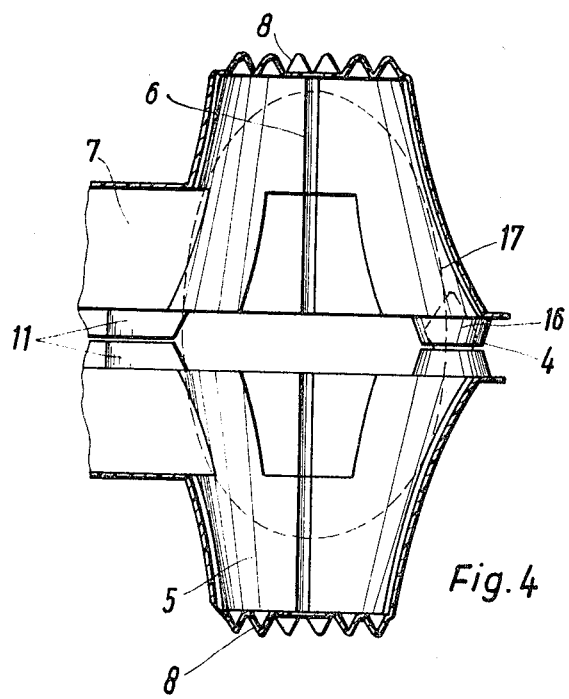

FIGURE 4, on a larger scale, shows an end view of one of the storage compartments formed in the tray.

Figure 3:
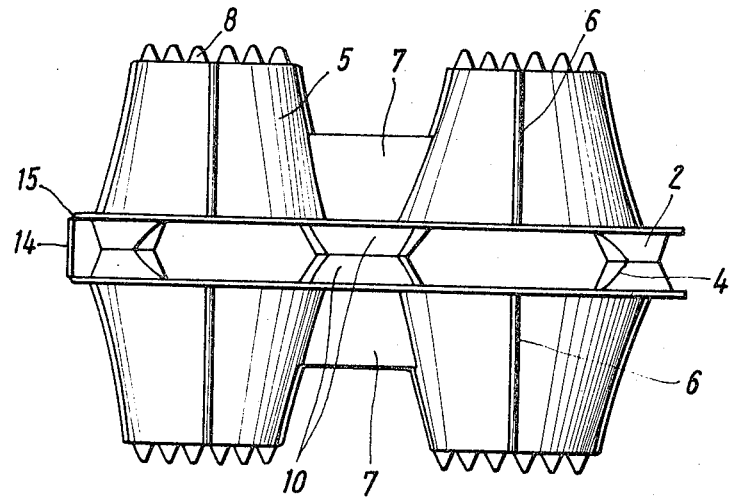
FIGURE 3 illustrates an end elevation of the tray in the closed state.
Figure 5:
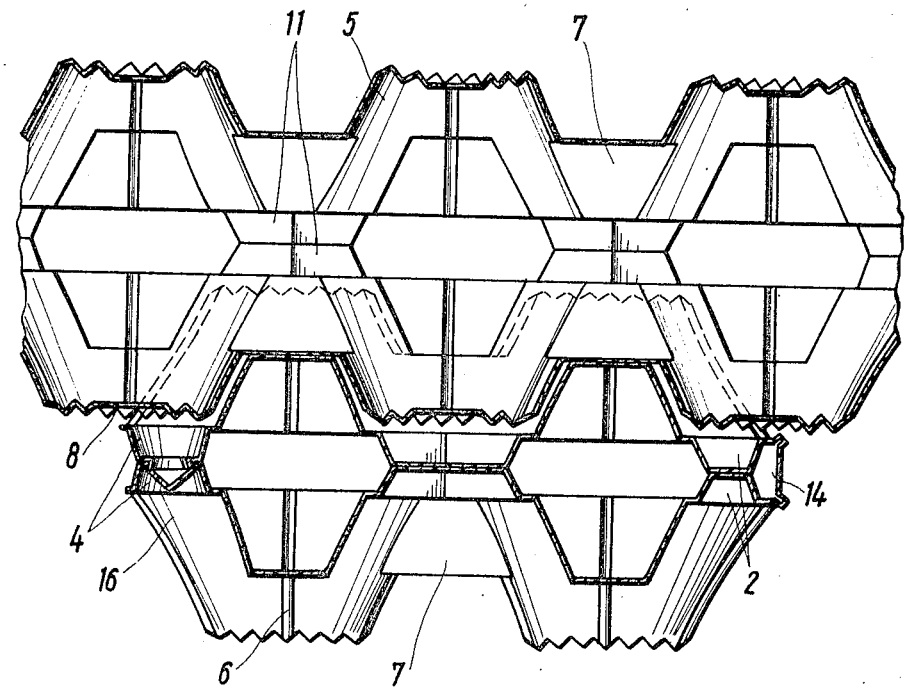

FIGURE 5 illustrates views similar to those of FIGURES 3 and 4, showing the connection between superimposed trays.

Figure 6:
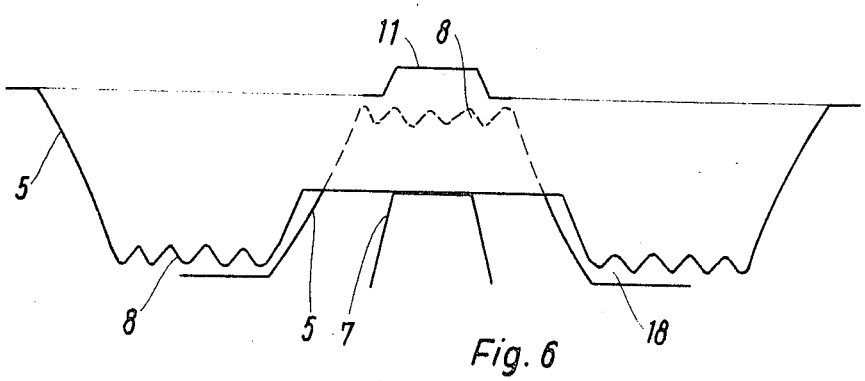

FIGURE 6 is a transverse sectional view showing the connection between the mating profiles.

Figure 1:
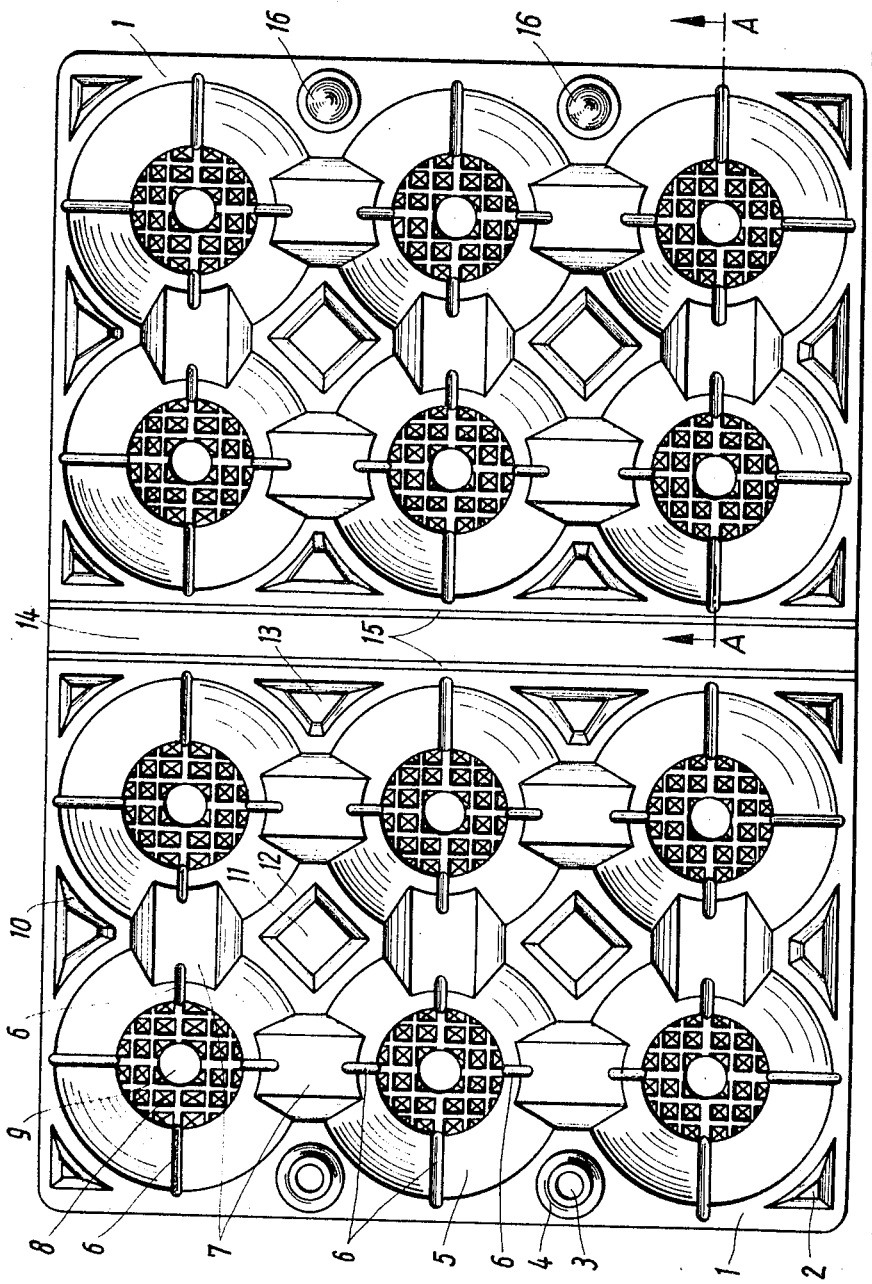
FIGURE 1 illustrates a plan view of a tray in the open condition.
Figure 2:
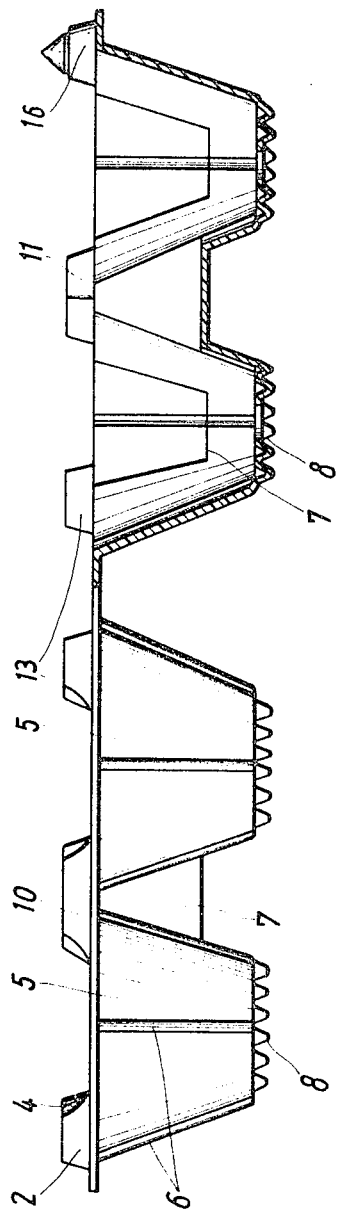
FIGURE 2 is a part end elevation and part section, the latter on the line A—A of FIGURE 1 and taken through the right-hand part of the tray.

The single component 1 (FIGURES 1 and 2) of which the tray is made is produced by the moulded formation of two similar parts, linked by the central strip 14 which, by means of the creases 15 enables the assembly to be closed (FIGURES 3 and 4) by inserting the locking pips 16 into the holes 3 which are surrounded by the beads 4, at the same time the supports 2 of the lateral corners 10 and 13 and central raised portions 11 coming into contact so that the two halves of the tray are correctly positioned in relation to one another.

As far as the application of the tray to the packing of fruits, objects or elements such as eggs 17 (FIGURE 4) is concerned, the tray is provided with the truncate conical cavities 5 with their associated radial stiffening ribs 6 arranged on the generatrices of the said conical surfaces, the storage spaces having holes 9 in their bases and the rest of the annular surface of these base portions containing a suitable patterned contour.

Between the cavities, there are flat portions 12 which surround the raised portions 11 at the level of the base portions 1, and the partitions 7 of isosceles trapezoidal cross-sectional form.

In FIGURE 5 and in FIGURE 6, the latter showing the intermediate part of the coupling arrangement, it can be seen how the truncate conical parts which, in the top tray, constitute the lower cavities, are located behind the corresponding partitions 7 in the bottom tray, the dispositions of which are as hereinbefore described. The reference 18 indicates the space which, when the trays are in position on top of one another, is left between the pyramid-patterned base of a cavity and the rim of the flat base part of the tray below.

The base of a truncated conical cavity of this sort has a form which is made up of a number of small pyramidal shapes 8 by which good location is achieved when a number of packing units are stacked one atop the other.

I claim:

1. A packing molded plastic tray comprising two halves, a hinge construction between said halves so that one half may be folded on the other half, truncate conical cavities with inwardly curved surfaces which are grooved along generatrix lines in said halves, a plurality of partitions in said halves having axes passing through the centers of said cavities in longitudinal and transverse directions at right angles to one another and said partitions having a height which exceeds half the height of said cavities so that when stacked on top of one another there is no contact between or pressure exerted upon said separate cavities and angled ribs are provided to reinforce and stiffen said tray.

2. A tray as claimed in claim 1 wherein protuberances are provided which have a press-stud action and act as spacers between the two halves of said tray.

3. A tray as claimed in claim 1 wherein the bases of said truncate conical cavities contain a relief pattern in the form of small pyramids.

References Cited

UNITED STATES PATENTS 2,885,136   5/1959   Grant _____ 229—2.5
3,356,277   12/1967  Hohnjec _____ 229—44

DAVID M. BOCKENEK, Primary Examiner.

U.S. Cl. X.R.

229—45, 44, 15